(12) United States Patent
Wu et al.

(10) Patent No.: US 7,521,503 B2
(45) Date of Patent: Apr. 21, 2009

(54) ETHYLENE/ALKYL ACRYLATE COPOLYMERS, COMPOUNDS AND VULCANIZATES THEREOF

(75) Inventors: Yun-Tai Wu, Bryn Mawr, PA (US); Mark Aaron Stewart, Wilmington, DE (US); Yi Ye, The Woodlands, TX (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 371 days.

(21) Appl. No.: 11/478,949

(22) Filed: Jun. 30, 2006

(65) Prior Publication Data

US 2007/0004853 A1 Jan. 4, 2007

Related U.S. Application Data

(63) Continuation-in-part of application No. 10/892,006, filed on Jul. 15, 2004, now Pat. No. 7,153,918.

(60) Provisional application No. 60/490,296, filed on Jul. 24, 2003.

(51) Int. Cl.
*C08L 31/00* (2006.01)
*C08F 20/10* (2006.01)
*C08F 210/00* (2006.01)

(52) U.S. Cl. .................. 524/556; 526/328; 526/348

(58) Field of Classification Search .................. 524/556
See application file for complete search history.

(56) References Cited

U.S. PATENT DOCUMENTS

| | | | |
|---|---|---|---|
| 3,873,494 A | 3/1975 | Lewis | |
| 3,883,472 A | 5/1975 | Greene | |
| 3,904,588 A | 9/1975 | Greene | |
| 4,275,180 A | 6/1981 | Clarke | |
| 5,194,516 A * | 3/1993 | Fisher et al. | ................. 525/387 |
| 5,498,669 A | 3/1996 | Williams | |
| 5,889,114 A * | 3/1999 | Statz | ........................... 525/166 |
| 6,136,920 A | 10/2000 | Hert | |
| 2003/0204025 A1* | 10/2003 | McBride | .................. 525/330.3 |
| 2005/0020775 A1 | 1/2005 | Wu et al. | |

FOREIGN PATENT DOCUMENTS

| | | |
|---|---|---|
| JP | 11-343378 A | 12/1999 |
| JP | 2000-44757 A | 2/2000 |
| WO | WO 2005/010059 A | 2/2005 |

OTHER PUBLICATIONS

PCT Partial Internatiional Search Report for International Application No. PCT/US2006/026085, dated Nov. 9, 2006.

* cited by examiner

*Primary Examiner*—David Wu
*Assistant Examiner*—Vu Nguyen

(57) ABSTRACT

Disclosed are copolymers derived from ethylene and at least two different alkyl acrylate comonomers, with or without an acid cure site-containing comonomer. The copolymers can be derived from (a) from 10 to 50 weight % of ethylene; (b) 20 to 30 weight % of a first alkyl acrylate having from 1 to 4 carbons in the alkyl group; from 35 to 45 weight % of a second different alkyl acrylate having from 1 to 4 carbons in the alkyl group; and (d) from 0 to 5 weight % of a 1,4-butene-dioic acid moiety, or anhydride or monoalkyl ester thereof; the remainder being ethylene: wherein the copolymer has a number average molecular weight ($M_n$) above 40,000. Also disclosed are compounded compositions comprising these copolymers and cured compositions (i.e., vulcanizates) as well as rubber articles formed from these compounded compositions, such as constant velocity joint boots and shaft boots, hoses, dampers, seals and gaskets. These copolymers provide improved dynamic fatigue resistance of cured compounds while maintaining an expanded operating temperature range and oil resistance. Blends of other polymers with these copolymers are also disclosed.

20 Claims, No Drawings

ETHYLENE/ALKYL ACRYLATE COPOLYMERS, COMPOUNDS AND VULCANIZATES THEREOF

The application is a continuation-in-part of application Ser. No. 10/892,006, filed Jul. 15, 2004 now U.S. Pat. No. 7,153,918 and claims priority to U.S. provisional application No. 60/490,296, filed Jul. 24, 2003, the entire disclosures of both applications are incorporated herein by reference.

The invention relates to ethylene copolymers derived from ethylene and at least two different alkyl acrylate comonomers, and an optional additional comonomer containing an acid cure site. The invention also relates to compounded compositions and cured vulcanizates using these copolymers. It also relates to articles derived from the compositions.

BACKGROUND

The automotive and transportation industries use elastomeric (rubber-like) materials for a number of underhood or powertrain parts that require elastic properties such as CVJ boots, gaskets, seals, hoses, dampers, etc. These parts require good heat and oil resistance. A number of synthetic polymeric materials have been provided for these applications. For example, U.S. Pat. No. 3,873,494 describes vulcanization of (among others) an elastomeric ethylene/($C_1$-$C_4$ alkyl) acrylate/($C_5$ or greater alkyl) acrylate terpolymer in the presence of a peroxide curing system and an antioxidant system that is accelerated by the presence of a butadiene/acrylonitrile polymer. U.S. Pat. No. 4,275,180 describes a polymer composition that comprises a crosslinkable or crosslinked blend of (among others) an elastomeric ethylene/($C_1$-$C_4$ alkyl) acrylate/($C_5$ or greater alkyl) acrylate terpolymer and a thermoplastic polymer. U.S. Pat. Nos. 3,883,472 and 3,904,588 disclose ethylene/acrylic ester/butenedioic acid monoester terpolymers, compounds and vulcanizates thereof. U.S. Pat. No. 5,498,669 discloses blends of ethylene/alkyl acrylate dipolymers, neutralized ethylene acid copolymers (ionomers) and organic peroxides, useful for continuous pressureless curing processes.

PCT Application Publication WO05/010059 discloses ethylene copolymers comprising ethylene copolymerized with two different alkyl acrylate comonomers having a balance of heat and oil resistance with lower glass transition temperature ranges.

Trends in the automotive industry require the elastomeric materials used in making automotive parts to have wider ranges (both high and low) of service temperature capabilities and good fluid resistance to meet new performance demands. It is also desirable that these elastomers have improved dynamic fatigue resistance. Such a combination of properties and moderate cost are highly desired.

SUMMARY OF THE INVENTION

The invention provides copolymers, compounded compositions involving these copolymers, and vulcanizates. The copolymers are characterized by higher number average molecular weight and narrower molecular weight distribution (polydispersity) than similar previous copolymers. The vulcanizates exhibit improved dynamic fatigue-cracking resistance and heat resistance over previous vulcanizates while maintaining oil resistance with an expanded operating temperature range.

This invention provides a composition comprising an ethylene copolymer derived from copolymerization of from about 10 to about 40 weight %, or from about 20 to about 30 weight %, of a first alkyl acrylate having from 1 to 4 carbons in the alkyl group; from about 15 to about 65 weight %, or from about 35 to about 45 weight %, of a second different alkyl acrylate having from 1 to 4 carbons in the alkyl group; from 0 to about 5 weight %, or from about 1 to 5 weight %, or about 2 to 5 weight % of 1,4-butene-dioic acid or its derivative, wherein the derivative is an anhydride of the acid or a monoalkyl ester of the acid wherein the alkyl group in the monoalkyl ester has from 1 to about 6 carbon atoms, or combinations of two or more thereof; and the remainder being ethylene; and the copolymer has a number average molecular weight ($M_n$) above 40,000, alternatively above 48,000, alternatively above 60,000; and preferably having a $M_n$ of from about 40,000 or about 45,000 to about 60,000 or about 65,000, a melt index (MI) from about 3 to about 30 g/10 minutes and a polydispersity from about 2.5 to about 6, or from 2.5 to 5.

This invention also provides compound compositions (i.e., precursors to vulcanizates and herein referred to as compounded compositions or merely compounds) comprising the above copolymers and further comprising or produced from a curing agent and optionally one or more additives including an antioxidant, an internal release agent, a scorch retarder, a plasticizer, an accelerator, or a filler.

This invention also provides the compounded composition described above further comprising or produced from at least one additional polymer including an ethylene alkyl acrylate copolymer, a polyacrylate copolymer, or combinations thereof.

This invention also provides vulcanizates comprising the above compounded compositions that are cured (for example at elevated temperatures and elevated pressures) for sufficient time to crosslink the copolymers, and optionally post-cured (for example at elevated temperature and ambient pressure) to further cure the vulcanizates.

This invention also provides an article comprising or produced from a composition that is as characterized as above or is the vulcanizate characterized as above wherein the article includes constant velocity joint boots, I-shaft boots, halfshaft boots, spark plug boots, hoses, seals, gaskets, dampers, belts, and ignition wire jacketing.

This invention also provides a process comprising contacting ethylene with a first alkyl acrylate having from 1 to 4 carbons in the alkyl group, a second different alkyl acrylate having from 1 to 4 carbons in the alkyl group and optionally 1,4-butene-dioic acid or its derivative, wherein the derivative is an anhydride of the acid or a monoalkyl ester of the acid wherein the alkyl group in the monoalkyl ester has from 1 to about 6 carbon atoms, or combinations of two or more thereof; under a condition effective to produce an ethylene copolymer; the first alkyl acrylate comprises from about 10 to about 40 weight %, the second different alkyl acrylate comprises from about 15 to about 65 weight %, the acid or its derivative comprises from 0 to about 5 weight %; the weight % is based on total weight of ethylene, first and second alkyl acrylate, and the acid or its derivative; and the condition includes a temperature from 120° C. to 185° C. a pressure from about 1900 to 2810 kg/cm² (186 MPa to 267 MPa), and a feed temperature from 30° C. to 90° C.

Also provided is the process characterized above further comprising combining the ethylene copolymer with a curing agent, optionally one or more additives, and optionally one or more additional polymers to produce a compounded composition; optionally forming the compounded composition into a desired shape and concurrently or sequentially curing and optionally post curing the compounded composition to produce a vulcanizate or article; wherein the additive includes antioxidant, an internal release agent, a scorch retarder, a plasticizer, an accelerator, or a filler, or combinations of two or more thereof; the additional polymer includes ethylene alkyl acrylate copolymer, a polyacrylate copolymer, or combinations thereof; and the article includes constant velocity joint boots, I-shaft boots, half-shaft boots, spark plug boots, hoses, seals, gaskets, dampers, belts, and ignition wire jacketing.

This invention also provides compositions comprising the copolymer described above and further comprising or produced from a second polymer including thermosets such as epoxy resins, phenolic resins, unsaturated polyester resins or vinyl ester resins subject to further curing; or thermoplastics; optionally further comprising fillers, reinforcing fibers (continuous or noncontinuous, woven or nonwoven) or fibrous structures such as pulps. This invention also provides an article comprising or produced from this composition wherein the articles can be made from processes such as coating, laminating, molding, extruding, filament winding, calendering or combinations thereof and subsequently curing.

This invention also provides the process characterized above further comprising combining the ethylene copolymer with a curing agent, one or more additional polymers including thermosets such as epoxy resins, phenolic resins or vinyl ester resins subject to further curing or thermoplastics such as polyamides, and optionally one or more additives including filler, reinforcing fiber, fibrous structure of pulps, or combinations of two or more thereof to produce a compounded composition; and fabricating the compounded composition into an article; the article includes printed circuit board, brake pad, or clutch facing; and fabricating includes coating, laminating, molding, extruding, filament winding, calendering, or combinations of two or more thereof, and subsequently curing.

DETAILED DESCRIPTION OF THE INVENTION

All references disclosed herein are incorporated by reference.

This invention provides copolymers comprising ethylene, two different alkyl acrylates and optionally an acid cure site, having higher number average molecular weight ($M_n$), lower melt index (MI) and preferably lower polydispersity than other polymers of the same comonomer proportions. The copolymers can be prepared by carrying out copolymerization at a combination of lower reactor temperature, higher reactor pressure, and higher feed temperature than described in U.S. Pat. Nos. 3,883,472 and 3,904,588. Preferably, the copolymers are random copolymers.

Polydispersity is defined as the weight-average molecular weight divided by the number average molecular weight ($M_w/M_n$ or PD). These molecular weight properties can be determined by using size exclusion chromatography.

"Copolymer" means polymers containing two or more different monomers. The terms "terpolymer" and "tetrapolymer" mean polymers containing three and four different monomers respectively.

The copolymers described above can be prepared by carrying out copolymerization at a combination of lower reactor temperature, higher reactor pressure, and higher feed temperature, resulting in higher number average molecular weight ($M_n$). The operation is carried out in a pressurized reactor at elevated temperature, from 120° C. to 185° C., or from 140° C. to 165° C.; reactor pressures of from 1900 to 2810 kg/cm² (186 MPa to 267 MPa), or from 2065 to 2810 kg/cm² (196 to 267 MPa), and feed temperatures from 30° C. to 90° C., or from 50° C. to 90° C.

The copolymers exhibit a glass transition temperature (Tg) below −25° C., preferably below −30° C., and more preferably below −35° C. measured by differential scanning calorimetry (DSC) on dried/devolatized copolymer according to ASTM method E1356-98 (using the inflection point). The heat-up rate is 10° C./minute. In presenting the Tg data hereinafter, it is noted that the measurements were based on DSC, which is a representative and reproducible direct measurement of the secondary polymeric morphology change contributing to the low temperature properties attributable to the polymer, per se.

The vulcanizates prepared from the copolymers provide improved dynamic flex fatigue resistance of vulcanizates or articles made from them, as shown by a DeMattia test at room temperature (23° C.). A DeMattia test ascertains the number of times a test sample can be repeatedly bent to produce cracking, leading to total failure. Higher molecular weight copolymers with a lower weight % of cure sites can improve the heat resistance and further enhance high temperature dynamic fatigue resistance of the vulcanizates.

The vulcanizates of this invention also exhibit an oil immersion volume increase (designated hereinafter as "VI") less than 110%, preferably less than 90%, measured according to ASTM D471-98 by immersion in ASTM IRM 903 oil for 168 hours at 150° C. with a plasticizer-free compound formulation.

The copolymers comprise ethylene, at least two different alkyl acrylates having from 1 to 4 carbons in the alkyl group, with or without an acid cure site. The alkyl group can be branched or unbranched. For example, the alkyl groups may be selected from methyl, ethyl, n-butyl and iso-butyl. Thus, the alkyl acrylates used in the preparation of the terpolymers and tetrapolymers as well as higher copolymers (e.g., pentapolymers, etc.) may be selected from methyl acrylate, ethyl acrylate, n-butyl acrylate and iso-butyl acrylate. Preferably, methyl acrylate or ethyl acrylate is used as the first alkyl acrylate and the second different alkyl acrylate has from 2 to 4 carbon atoms in the alkyl group (when ethyl acrylate is used as the first alkyl acrylate, the second alkyl acrylate has 3 or 4 carbon atoms in the alkyl group). Combinations of alkyl acrylates include combinations of methyl acrylate and a second alkyl acrylate selected from the group consisting of ethyl acrylate, n-butyl acrylate, and iso-butyl acrylate. Methyl acrylate with n-butyl acrylate is also a combination. The total acrylate content may be present from about 40 to about 75 or about 47 to about 70 weight % of the copolymer.

For example, the first alkyl acrylate is methyl acrylate, ethyl acrylate, or combinations thereof; the second alkyl acrylate has 3 or 4 carbon atoms in the alkyl group; and the copolymer has an $M_n$ from about 40,000 or about 45,000 to about 65,000 and a polydispersity of from about 2.5 to 5.

The terpolymer contains no cure site component, whereas the tetrapolymer and higher copolymers may contain 1,4-butene-dioic acid moieties, or anhydrides or monoalkyl esters of the acid. When the copolymer contains 1,4-butene-dioic acid moieties, or anhydrides or monoalkyl esters thereof, they can be present at from about 1 to 5 weight % of the total copolymer, or from 2 to 5 weight %, or from 2 to 4 weight %. Of note are acid cure sites that comprise monoalkyl esters of 1,4-butene-dioic acid, in which the alkyl group of the ester has from 1 to 6 carbon atoms. The 1,4-butene-dioic acid and esters thereof exist in either cis or trans form, i.e. maleic and fumaric acid. Monoalkyl esters of either are satisfactory. Methyl hydrogen maleate, ethyl hydrogen maleate, propyl hydrogen maleate, butyl hydrogen maleate, or combinations of two or more thereof are particularly satisfactory as the acid cure site.

Ethylene is the third component in the terpolymer and is the fourth component in the tetrapolymer. As such, ethylene represents essentially the remainder of the copolymer relative to the required two or more different alkyl acrylates and the optional acidic cure site comonomer; i.e., polymerized ethylene is present in the copolymers in a complementary amount.

Examples of copolymers include copolymers of ethylene (E), methyl acrylate (MA) and n-butyl acrylate; copolymers of ethylene, methyl acrylate, n-butyl acrylate and methyl hydrogen maleate; copolymers of ethylene, methyl acrylate, n-butyl acrylate and ethyl hydrogen maleate; copolymers of ethylene, methyl acrylate, n-butyl acrylate and propyl hydrogen maleate; and copolymers of ethylene, methyl acrylate, n-butyl acrylate and butyl hydrogen maleate.

Small amounts of other comonomers as known in the art can be incorporated into the copolymer provided no significant increase in the copolymer Tg results. Thus for example, it is contemplated that small amounts (a few percent) of alkyl methacrylate comonomer can be used in addition to the two different alkyl acrylates.

The quantities of total alkyl acrylates and the optional acid cure site monomer are adjusted to provide the required amount of ($-CO_2-$) units in the final copolymer. The total ($-CO_2-$) units in the polymer are the sum of the acid and ester groups in the two or more acrylate comonomers and in the 1,4-butene-dioic acid moiety (if present). It has been found that the total ($-CO_2-$) quantity (in percentage) determines the polarity of the polymer and thus affects the oil resistance (i.e. resistance to swelling in the presence of oil). Lowering the weight percent of the cure site improves dynamic fatigue resistance.

In addition to affecting oil swell, each of the ($-CO_2-$) containing components may affect Tg with a different weighting factor. For example, methyl acrylate may increase Tg percentage increase in weight more than the n-butyl acrylate whereas the monoalkyl ester of 1,4-butene-dioic acid may increase the Tg more than the methyl acrylate can. The amount of ethylene in the copolymer may be dependent on the amounts of the polar components. Higher percentages of ethylene may contribute to lower Tg, but may do so at the expense of the desired elastomeric properties. Once the cure site monomer quantity in the copolymer is fixed based on cure chemistry required, one needs to optimize the total quantity of acrylates and the relative distribution of the two acrylates based on the final target of low temperature capability and oil resistance. As long as there is no component containing unsaturation in the polymers and the cure chemistry remains unchanged, the heat resistance remains the same.

Noted is a composition comprising a copolymer wherein the first alkyl acrylate is either methyl acrylate or ethyl acrylate, and the second alkyl acrylate has 3 or 4 carbon atoms in the alkyl group; preferably the total acrylate content comprises from about 40 to 75 weight percent, or from about 47 to 70 weight percent of the copolymer, preferably wherein the first alkyl acrylate is methyl acrylate and the second alkyl acrylate is n-butyl acrylate; more preferably comprising from 20 to 30 weight % of methyl acrylate comonomer; from 35 to 45 weight % of n-butyl acrylate comonomer; and from 2 to 5 weight % of a monoethyl ester of 1,4-butene-dioic acid comonomer.

Of note is a copolymer wherein the first alkyl acrylate comonomer is methyl acrylate present in the copolymer at 10 to 40 weight % and wherein the second alkyl acrylate comonomer is n-butyl acrylate present in the copolymer from a lower limit of 15 weight % when methyl acrylate is present within the range of 23 to 40 weight % and from a lower limit of 47 weight % when methyl acrylate is present a 10 weight % and from lower limit that varies linearly between the lower limit at 10 weight % methyl acrylate and the lower limit at 23 weight % methyl acrylate to an upper limit of 35 weight % when methyl acrylate is present at 40 weight % and to an upper limit of 65 weight % when methyl acrylate is present at 10 weight % and to an upper limit that varies linearly between 40 and 10 weight % methyl acrylate.

Of note is a copolymer wherein the first alkyl acrylate comonomer is methyl acrylate present in the copolymer at 15 to 30 weight % and wherein the second alkyl acrylate comonomer is n-butyl acrylate present in the copolymer from a lower limit of 20 weight % when methyl acrylate is present within the range of 27 to 30 weight % and from a lower limit of 45 weight % when methyl acrylate is present at 15 weight % and from lower limit that varies linearly between the lower limit at 15 weight % methyl acrylate and the lower limit at 27 weight % methyl acrylate to an upper limit of 45 weight % when methyl acrylate is present at 30 weight % and to an upper limit of 60 weight % when methyl acrylate is present at 15 weight % and to an upper limit that varies linearly between 30 and 15 weight % methyl acrylate.

Copolymers without acid cure sites (terpolymers) can be readily prepared by copolymerizing ethylene and two different alkyl acrylates having from 1 to 4 carbons in the alkyl group, in the presence of a free-radical polymerization initiator including for example peroxygen compounds or azo compounds. Copolymers with acid cure sites (tetrapolymers) can be similarly prepared by copolymerizing ethylene, two different alkyl acrylates having from 1 to 4 carbons in the alkyl group, and 1,4-butene-dioic acid moieties, anhydrides, or monoalkyl esters thereof.

The copolymerizations may be run by continuously feeding ethylene, the first and second alkyl acrylates, acid cure-site comonomer if desired (for example a monoalkyl ester of the acid), a free radical initiator, and optionally a solvent such as methanol or the like (see e.g., U.S. Pat. No. 5,028,674) to a stirred autoclave of the type disclosed in U.S. Pat. No. 2,897,183. Alternatively, other high-pressure reactor designs with sufficient mixing, residence time, temperature and pressure control, generally known in the art as an autoclave, operated either alone or in series with or without inter-stage cooling or heating, with multiple compartments and feed zones may be employed. Reactor dimensions such as volume, length and diameter may also influence operating conditions. The rate of conversion may depend on variables such as the polymerization temperature and pressure, monomer feed temperature, the different monomers employed, concentration of the monomers in the reaction mixture, and residence time for the desired yield and copolymer composition. It may be desirable to adjust the residence time and, in some cases, to use a telogen (chain transfer/chain terminating agent) such as propane, to help adjust the molecular weight. The reaction mixture is continuously removed from the autoclave. After the reaction mixture leaves the reaction vessel, the copolymer is separated from the unreacted monomers and solvent (if solvent was used) by, for example, vaporizing the unpolymerized materials and solvent under reduced pressure and at an elevated temperature. The terms "feed temperature" and "monomer feed temperature" refer to the temperature at which the comonomers are controlled prior to their introduction into the reactor.

The copolymerization can be carried out in a pressurized reactor at elevated temperature, from 120° C. to 185° C., or from 140° C. to 165° C.; pressures of from 1900 to 2810 kg/cm² (186 MPa to 267 MPa), or from 2065 to 2810 kg/cm² (196 to 267 MPa); and feed temperatures from 30° C. to 90° C., or from 50° C. to 90° C.

Appropriate peroxide initiators for the copolymerization process may depend on the reactor operating conditions, such as temperature and pressure, comonomers used, comonomer concentration, and inhibitors that are typically present in commercially available comonomers. The initiator can be employed neat as a liquid, dissolved or diluted in a suitable solvent such as odorless mineral spirits or mixed with another different initiator. Common classes of organic peroxides useful as free radical initiators include dialkyl peroxides, peroxy esters, peroxy dicarbonates, peroxy ketals, and diacyl peroxides. Examples of suitable peroxides include di(3,3,5-trimethyl hexanoyl) peroxide, tert-butyl peroxypivalate, tert-butyl peroxyneodecanoate, di(sec-butyl) peroxydicarbonate, and tert-amyl peroxyneodecanoate. These and other suitable peroxides are available under the Luperox® tradename from Arkema or the Trigonox® tradename from Akzo Nobel. Similarly, suitable azo initiators can be used.

After the continuous operation has reached a steady state, the total per-pass conversion of monomers to polymer may vary from 5 to 25 weight %. The melt index (MI) of a copolymer may be roughly related to its molecular weight; the lower the MI the higher the molecular weight. The MI values are determined at 190° C. as described in ASTM test method D1238-01 (Procedure A, Condition 190/2.16). The copolymers have MI that vary, depending on polymerization conditions or the use of a telogen additive, typically but not limiting from about 3 to about 30 g/10 minutes, or from about 3 to about 25 g/10 minutes. The percent by weight of the acid cure site monomer in the composition, for example an alkyl hydrogen maleate, can be determined by end-point titration using a phenolphthalein indicator (or the like) with a standardized methanolic caustic titre and a known weight of polymer dissolved in a heated/refluxed xylene/butanol mixture. The weight percent of each alkyl acrylate is determined by proton nuclear magnetic resonance (NMR) or Fourier-transform infrared (FTIR) analysis, after calibration by NMR.

The composition often contains some alkyl acrylate monomer residuals. Removal of monomer residuals is generally known in the art as a devolatilization or finishing step. For small laboratory scale preparations, devolatilization can be accomplished by heating in a vacuum oven for a period of time (for example, heating to 140° C. with a 635 mm Hg vacuum for four hours). For larger-scale preparations, the residuals can be removed by processing through a single or twin-screw extruder with vacuum ports at elevated temperature. Optionally, in finishing the copolymer a release agent (such as R2 listed in Table A) may be added at about 0.1 to 1 weight % in order to improve handling.

Alternatively, finishing can be accomplished by using a small quantity of peroxides, or coagents or a combination of both, injected into the polymer melt upstream. The peroxides used are preferably those that decompose rapidly within the range of 150 to 250° C. Examples of suitable peroxides include dicumyl peroxide, 1,1-di-(t-butylperoxy)-3,3,5-trimethyl-cyclohexane, 2,5-bis(t-butylperoxy)-2,5-dimethyl hexane, and α,α-bis(t-butylperoxy)-diisopropylbenzene. The peroxide may be dissolved in mineral spirits. The amount of peroxide injected may vary with the acrylate types, the level of the residuals, and the twin-screw extruder processing conditions. A typical range may be from 200 ppm to 8000 ppm, alternatively from 500 ppm to 5000 ppm. Residual levels in the finished copolymer are preferably below 2500 ppm, more preferably below 1500 ppm, and even more preferably below 1000 ppm. Coagents can be used; for example, from about 500 to about 4500 ppm of trimethylol-propane triacrylate, available as Sartomer 351. Optionally, a release agent (such as R2 listed in Table A) may be added at about 0.1 to 1 weight percent in order to improve handling.

In the finishing operation, screw size and design may impact the amount of copolymer that can be processed and may in turn impact the selection of the appropriate processing variables, including for example screw speed, residence time, temperature, optional peroxide amounts and optional coagent amounts. One skilled in the art can design the appropriate processing variables to achieve a balance among these variables necessary for preparation of suitable finished compositions. Adjusting finishing variables can impact the levels of residual monomers (i.e., free comonomers, measured by gas chromatography headspace analysis) present in the finished composition.

The finished ethylene copolymers described above are mixed with additional materials (a process known in the art as compounding) to provide a compounded composition that can be cured (a process known in the art as vulcanizing) to provide a vulcanizate. The compositions can be compounded and cured according to the following procedures.

Compounding involves combining the finished copolymer with added ingredients such as cure agents, antioxidants, internal release agents, scorch retarders, plasticizers, accelerators, fillers and the like. Preferred and notable compounded compositions comprise the preferred and notable copolymers described above.

Optionally, the copolymers can be combined or blended with ethylene alkyl acrylate copolymers, including ethylene di- and terpolymers as generally known in the art (so-called AEM type materials); for example, an ethylene/methyl acrylate dipolymer or an ethylene/methyl acrylate/acid cure site terpolymer with number average molecular weight of less than 40,000, and the like; as well as in combination with polyacrylate copolymers, as generally known in the art (so-called ACM type materials); for example, ethyl acrylate/butyl acrylate/methoxyethyl acrylate/cure site and the like. Blends with AEM materials (e.g. ethylene/methyl acrylate/acid cure site with lower molecular weight) may provide improved low temperature flexibility as well as improved dynamic fatigue resistance. Blends with polyacrylate ACM materials (e.g. ethyl acrylate/butyl acrylate/methoxyethyl acrylate, ethyl acrylate/butyl acrylate/cure site and the like) may provide improved processibility and low temperature flexibility.

The ingredients of the compounds (including the copolymer, cure agents, additives, and/or additional polymers) can be mixed in known equipment such as an internal mixer (e.g., a Banbury mixer), a two-roll mill and other similar mixing devices known in the art to achieve a well-dispersed mixture.

After compounding, the compositions can be vulcanized. Preferred and notable vulcanized compositions comprise the preferred and notable copolymers and compounded compositions described above. A blend of the uncrosslinked (unvulcanized) copolymer and a curing agent optionally along with various fillers, other additives and/or polymers is subjected to a curing step at sufficient time, temperature and pressure to achieve covalent chemical bonding (i.e., crosslinking). Vulcanization involves curing the compounded composition at elevated temperature and elevated pressure for sufficient time to crosslink the copolymer (often referred to as press-curing in laboratory preparations), followed by an optional post-cure heating at ambient pressure to further cure the elastomer. For example, the vulcanizate may be formed and cured using known procedures at about 160° C. to about 200° C. for about 2 to 60 minutes. Post-cure heating may be conducted at about 160° C. to about 200° C. for one to several hours.

The compounded compositions, such as those comprising a copolymer without an acid cure site, can be vulcanized, for example, in the presence of a peroxide curing system comprising a peroxide and optionally a coagent. Suitable peroxides and coagents include essentially any such curative system as generally known in the art, including those described herein, operative at the temperature being employed during vulcanization. A preferred peroxide is α,α-bis(t-butylperoxy)-diisopropylbenzene (available from GEO Specialty Chemicals under the tradename Vul-cup®). About 0.5 to 5 parts by weight of peroxide per 100 parts of polymer (phr) may be employed to vulcanize a composition. For safer handling and mixing, the peroxide may be provided on an inert carrier. Peroxide curing systems can be used with either terpolymers or tetrapolymers.

The coagent or accelerator used in peroxide cure can be, for example, N,N'-(m-phenylene) dimaleamide, trimethylolpropane trimethylacrylate, tetraallyloxyethane, triallyl cyanurate, tetramethylene diacrylate, or polyethylene oxide glycol dimethacrylate. A preferred coagent/accelerator is N,N'-(m-phenylene) dimaleamide, available from DuPont Performance Elastomers as HVA-2. The amount of the coagent may be about 0 to 5 parts by weight of coagent per 100 parts of polymer, preferably about 1 to 5 parts by weight per 100 parts of polymer.

Vulcanizing or curing agents that can be used with the copolymers containing acid cure sites include di- and multifunctional amine curing systems, such as hexamethylenediamine carbamate (HMDAC), hexamethylenediamine (HMDA), triethylenetetramine, tetramethylenepentamine, hexamethylenediamine-cinnamaldehyde adduct, and hexamethylenediamine dibenzoate salt. Aromatic amines can also be used as curing agents. Combinations of two or more curing agents may also be used. The curing agent(s) may be added neat or in an inert carrier. Methods for curing using aqueous HMDA are described in U.S. Pat. No. 7,001,957.

The vulcanization of acid cure site containing polymers can also include various vulcanization accelerators as generally known in the art. Representative accelerators include guanidine, arylguanidines, alkylguanidines or mixtures thereof. Example accelerators are tetramethylguanidine, tetraethylguanidine, diphenylguanidine and di-ortho-tolyl guanidine. The level of application of guanidine type accelerators is 1 to 6 parts per hundred (phr) of copolymer, preferably 3 to 5 phr. The preferred accelerators are diphenylguanidine (DPG) and di-ortho-tolyl guanidine (DOTG), or a combination thereof.

A curing process may use, for example, 1.25 parts of HMDAC and 4 parts DOTG (alternatively 2 parts DPG and 2 parts DOTG) per 100 parts by weight of a copolymer containing the monoester acid cure site monomer along with other ingredients being mixed in a Banbury-type internal mixer or on a roll mill followed by a curing step for 5 to 30 minutes at 180° C. at a pressure of about 84 kg/cm$^2$ (8.24 MPa) (see U.S. Pat. No. 3,904,588) and optionally post curing at 160-180° C. for one to several hours.

The vulcanizates may contain an antioxidant system typically based on, but not limited to a phosphorus ester antioxidant, a hindered phenolic antioxidant, an amine antioxidant, or a mixture of two or more of these compounds. The proportion of the antioxidant compound in the vulcanizing composition is 0.1 to 5 parts by weight per 100 parts of polymer, preferably about 0.5 to 2.5 parts by weight per 100 parts of polymer. The antioxidant improves the air heat aging of the vulcanizate. Below the lower limit of this range, the antioxidant effect may be low. The weight ratio of the phenolic or amine antioxidant to the phosphorus compound in mixtures can be about 0.5 to 3; preferably about 1.

The phosphorus ester can be for example, tri(mixed mono- and dinonylphenyl) phosphite, tris(3,5-di-t-butyl-4-hydroxyphenyl phosphate, high molecular weight poly(phenolic phosphonates), and 6-(3,5-di-t-butyl-4-hydroxy)benzyl-6H-dibenz-[c,c][1,2]oxaphosphorin-6-oxide, or combinations of two or more thereof.

Suitable hindered phenolic antioxidants can be, for example, 4,4'-butylidenebis(6-t-butyl-m-cresol), 1,3,5-trimethyl-2,4,6-tris-(3,5-di-t-butyl-4-hydroxybenzyl)benzene, 2,6-di-t-butyl-a-dimethylamino-p-cresol and 4,4'-thiobis-(3-methyl-6-t-butylphenol), or combinations of two or more thereof.

Amine antioxidants include, for example, polymerized 2,2, 4-trimethyl-1,2-dehydroquinoline; N-phenyl-N'-(p-toluenesulfonyl)-p-phenylenediamine, N,N'-di(β-naphthyl)-p-phenylenediamine and 4,4'-bis(α,α-dimethylbenzyl) diphenylamine, or combinations of two or more thereof.

Antioxidant compositions can contain tri(mixed mono- and dinonylphenyl) phosphite mixed with either 4,4'-butylidenebis(6-t-butyl-m-cresol) or 4,4'-bis(α,α-dimethylbenzyl)diphenylamine. Particularly preferred antioxidant compositions contain 4,4'-bis(α,α-dimethylbenzyl)-diphenylamine (available commercially as Naugard® 445 from Chemtura).

Fillers can be used to reduce cost and to improve mechanical properties. A vulcanized composition may contain from 25 to 60 or 70 volume percent of fillers, alternatively from 30 to 120 or 150 parts of filler per hundred parts of polymer. Suitable fillers include, for example but not by way of limitation, carbon black, calcium carbonate, magnesium silicate or silica, notably carbon black. The preferred proportion can depend on the reinforcing effect of the filler used, which can be influenced by factors such as particle size of the filler.

The vulcanizates of the plasticizer-free copolymers (terpolymer, tetrapolymers, and higher) exhibit an oil swell of less than 110%, preferably less than 90%; a Tg less than −25° C., preferably less than −30° C., and more preferably less than −35° C.; and similar heat aging resistance and improved dynamic fatigue resistance compared to previous copolymers.

A higher molecular weight low Tg copolymer can also be used in blends with existing copolymers derived from a single alkyl acrylate (e.g. ethylene/methyl acrylate/acid cure site) as well as with polyacrylates (e.g. ethyl acrylate/butyl acrylate/methoxyethyl acrylate, ethyl acrylate/butyl acrylate/butenedioic acid monoalkyl ester/cure site and the like) to lower the temperature capability for applications such as boots, hoses, dampers, seals and gaskets.

Once cross-linked, the compositions disclosed herein are not thermoplastic, per se, so articles prepared may be formed into the desired shape by molding or extrusion procedures and concurrently or subsequently cured.

The vulcanizates can be used in a wide variety of automotive and nonautomotive articles, including CVJ boots, spark plug boots, I-shaft boots, half-shaft boots and other miscellaneous molded boots, ignition wire jacketing, hoses, belts, dampers, tubing, seals and gaskets. Hoses include but are not limited to turbocharger hoses, turbo diesel air cooler hoses, transmission oil cooler hoses, power steering hoses (low pressure), air conditioning hoses, air ducts, fuel line covers, and vent hoses. The vulcanizates are also useful for crankshaft torsional dampers and for noise management parts such as grommets.

The articles can be prepared by compounding the copolymer with added ingredients such as cure agents, antioxidants, internal release agents, scorch retarders, plasticizers, accelerators, fillers and the like and forming the composition into the desired shape by, for example, injection molding, compression molding or transfer molding. The compositions are held in the molds at elevated temperature and pressure for a period of time to initiate crosslinking (curing) and the shaped compositions are then removed from the molds and optionally heated at ambient pressure (post-curing) to continue the curing.

In some cases such as hoses, the compounded composition as described above can be formed into a shaped article by extrusion through an appropriately designed die. The initially-shaped article can be further shaped by forming with a mandrel while still pliable prior to curing. Hoses and tubing can be cured by treatment with super heated steam, hot air or hot inert gases such as nitrogen to provide the necessary heat and pressure.

Some articles may comprise elements in addition to the compositions as described herein. For example, articles (e.g. seals) may be prepared in which the composition of this invention is molded around a metal or plastic element. Other articles (e.g. hoses) can be extruded with reinforcing fibers, fiber structures or cording incorporated therein.

Although the copolymers are discussed herein primarily in terms of their use in compositions capable of forming elastomeric vulcanizates, they may also be used in other applications. Accordingly, this invention also provides compositions comprising the copolymers described above and further comprising or produced from a second polymer including thermosets such as epoxy resins, phenolic resins or vinyl ester resins subject to further curing; or thermoplastics; optionally further comprising fillers, reinforcing fibers or fibrous structures such as pulps. Reinforcing fibers can be continuous or noncontinuous, woven or nonwoven. The fibers may be made of glass, carbon (graphite), para-aramids, meta-aramids, metal or mineral. Curing processes include, for example but not limited to, use of peroxide-based systems or di- and multi-functional amine systems, with application of heat and optionally pressure.

The copolymers provide, for example but not limited to, toughening for polyamide compositions (for example, at less than 30 weight % of copolymer in the polyamide composition). Polyamides include those known in the art. Polyamides generally can be prepared from lactams or amino acids (e.g. nylon-6 or nylon-11), or prepared from condensation of diamines such as hexamethylenediamine with dibasic acids such as succinic, adipic, or sebacic acid. Copolymers and terpolymers of these polyamides are also included. Polyamides include polyepsiloncaprolactam (nylon-6), polyhexamethylene adipamide (nylon-66), nylon-11, nylon-12, nylon-12,12 and copolymers and terpolymers such as nylon-6/66, nylon-6/10, nylon-6/12, nylon-66/12, nylon-6/66/610 and nylon-6/6T, or combinations of two or more thereof. Notable polyamides are polyepsiloncaprolactam (nylon-6), polyhexamethylene adipamide (nylon-66), particularly nylon-6, or combinations of two or more thereof. In addition to the polyamides described above, other polyamides such as amorphous polyamides may also be used.

An article comprising or produced from compositions comprising the copolymer and further comprising at least one additional polymer can be made from processes such as coating, laminating, molding, extruding, filament winding, calendering or combinations thereof. Examples of such articles include printed circuit boards, brake pads, clutch facings and other articles fabricated from toughened thermosets.

While the invention has been particularly shown and described with reference to certain embodiments thereof, it is understood by those skilled in the art that various changes in form and details may be made without departing from the spirit and scope of the invention. The following examples are merely illustrative, and are not to be construed as limiting the scope of the invention.

EXAMPLES

For example, a copolymer was produced in a high pressure pilot-scale autoclave reactor at a reactor temperature of 145° C. and a pressure of 2180 kg/cm$^2$ (214 MPa), a feed temperature of 50° C. with an ethylene feed rate of 6.8 kg/h, a methyl acrylate feed rate of 0.8 kg/h, an n-butyl acrylate feed rate of 1.3 kg/h, an ethyl hydrogen maleate feed rate of 72 g/h, a methanol solvent feed rate of 0.45 kg/h, and a propane telogen feed rate of 1.14 kg/h. Di(sec-butyl) peroxydicarbonate (Luperox® 225 from Arkema) initiator was used, diluted to 5 volume % in odorless mineral spirits.

This process provided a copolymer at an average rate of 1.6 kg/h, having an average MI of 24.8 g/10 minutes. The copolymer comprised 23 weight % of MA, 40 weight % of nBA and 3.2 weight % of ethyl hydrogen maleate, with a number average molecular weight $M_n$ of 50,700 and a polydispersity of 3.69.

Other copolymers were prepared similarly and are summarized in Table 1. In the Tables "- -" stands for no data. Amounts of comonomers in the final copolymer are indicated in weight percent, unless indicated otherwise.

Tg was determined by methods described previously on devolatilized samples (for laboratory-scale samples, by vacuum oven drying at 140° C., 635-mm Hg vacuum for four hours).

The molecular weights of the copolymers were determined by using the size exclusion chromatography (alternatively known as GPC, Gel Permeation Chromatography) technique common to the field. An integrated multi-detector size exclusion chromatography system, such as GPCV 2000™ from Waters Corporation (Milford, Mass.) was used. It is capable of keeping a constant temperature across the entire path of a polymer solution from the injector through detectors. Two differential on-line detectors were used in series: a refractive index detector and a capillary viscometer detector. There were four 8 mm×300 mm styrene-divinyl benzene columns in the system, for separation: two linear GPC KF806M, one GPC KF802 and one GPC KF-801, all from Shodex (Japan). The mobile phase was tetrahydrofuran stabilized with 0.05% butylated hydroxytoluene, (J.T. Baker, Phillipsburg, N.J.). The columns were calibrated with a set of 10 narrow polydispersity (<1.1) polystyrene (PS) standards with peak molecular weights from 580 through 7,500,000 (Polymer Laboratories). Test samples were prepared by dissolving the polymer in mobile phase solvent at 40° C. with continuous moderate agitation without filtration (automatic sample preparation system PL 260™ from Polymer Laboratories, Church Stretton, UK). The sample was injected into the column and data collected. The operating conditions were: temperature, 40° C.; flow rate, 1.0 ml/min; injection volume, 0.219 ml; run time, 90 minutes. The data were analyzed with the software Empower™ 1.0 Chromatography Data Manager from Waters.

The copolymers were compounded with additional components including curing agents, scorch retarders, accelerators, fillers, release aids, antioxidants and plasticizers (see Table A below) according to the following general procedure.

The respective starting ingredients were mixed on a B or OOC size Banbury mixer using an upside-down mixing procedure and a dump temperature of 100° C. followed by further mixing on a two-roll mill at about 25° C. to achieve a homogeneous mixture. Amounts of components in the Tables hereafter are provided in parts per hundred (phr) of polymer.

TABLE A

| | Material | Trade Name | Supplier |
|---|---|---|---|
| Release Aids/ Scorch Retarders | | | |
| R1 | Octadecyl Amine | Armeen ® 18D | Akzo Nobel |
| R2 | Complex Organic Phosphate Ester | Vanfre ® VAM | R. T. Vanderbilt |
| R3 | Stearic Acid | | |
| Anti-oxidants | | | |
| A1 | 4,4'-bis(α,α-dimethylbenzyl)-diphenylamine | Naugard ® 445 | Chemtura |
| Plasticizers | | | |
| P1 | Mixed Ether/Ester Plasticizer | TP ®-759 | Rohm & Haas |
| Fillers | | | |
| F1 | Carbon Black (FEF N-550) | | |
| Cure Systems | | | |
| CA1 | Hexamethylene Diamine Carbamate | Diak ™ #1 | DuPont Performance Elastomers |
| CA2 | Di-ortho-tolyl Guanidine (DOTG) | | |
| CA3 | Diphenyl Guanidine (DPG) | | Swan |

Vulcanized slabs of 1.9 mm nominal thickness were prepared by press-curing the compounded composition for 5 to 10 minutes at 177° C. (or 180° C.) at a pressure of about 4140 kPa. The vulcanizates were then post-cured at 175° C. for one to four hours at ambient pressure. Slabs at 3 mm nominal thickness were prepared similarly. The slabs were cut into test coupons for material property testing.

Samples for the DeMattia testing were prepared by molding the compounded composition into test coupons for 10 to 20 minutes at 177° C. to 180° C. at a pressure of about 4140 kPa and then post-curing at 175° C. for four hours at ambient pressure.

Compression set testing was conducted according to ASTM D395-02. Heat aging testing was conducted according to ASTM D573-99. Mooney viscosity and Mooney scorch testing were conducted according to ASTM D1646-03. MDR testing was conducted according to ASTM D5289-95 (reapproved 2001). DeMattia testing was conducted according to ASTM D813-95 (reapproved 2000). Fluid aging testing was conducted according to ASTM D471-98.

The following Examples illustrate materials comprising ethylene copolymers derived from ethylene, methyl acrylate, n-butyl acrylate and an additional acid cure site comonomer. In Table 1, Examples 2 and 3 illustrate that lower reactor temperature and higher feed temperature were factors in raising molecular weight and lowering polydispersity compared to Comparative Example C1, a pilot scale tetrapolymer. Each copolymer was compounded in two formulations.

TABLE 1

| Copolymer | | | |
|---|---|---|---|
| Reaction Conditions | C1 | 2 | 3 |
| Pressure (kg/cm$^2$) | 2180 | 2180 | 2180 |
| Reactor Temperature (° C.) | 165 | 145 | 145 |
| Feed Temperature (° C.) | 10 | 50 | 50 |
| Ethylene weight % | 32.8 | 33.5 | 34.1 |
| MA weight % | 22.6 | 22.9 | 22.9 |
| nBA weight % | 40.5 | 39.7 | 39.9 |
| Cure Site weight % | 4.1 | 3.9 | 3.2 |
| Melt Index | 60 | 21.4 | 22.4 |
| Tg (Dried), ° C. | −42.0 | −42.0 | −42.8 |
| $M_n$ divided by 1000 | 39.2 | 50.0 | 50.7 |
| $M_w$ divided by 1000 | 253 | 187.2 | 187.2 |
| Polydispersity | 6.44 | 3.75 | 3.69 |

| Compounded Composition | | | | | | |
|---|---|---|---|---|---|---|
| Compound | C101 | 102 | 103 | C104 | 105 | 106 |
| Copolymer | C1 | 2 | 3 | C1 | 2 | 3 |
| Amount of Copolymer, phr | 100 | 100 | 100 | 100 | 100 | 100 |
| A1 | 2 | 2 | 2 | 2 | 2 | 2 |
| R3 | 1.5 | 1.5 | 1.5 | 1.5 | 1.5 | 1.5 |
| R2 | 1.5 | 1.5 | 1.5 | 1.5 | 1.5 | 1.5 |
| R1 | 0.5 | 0.5 | 0.5 | 0.5 | 0.5 | 0.5 |
| F1 | 70 | 65 | 65 | 55 | 50 | 50 |
| P1 | 17.5 | 17.5 | 17.5 | 0 | 0 | 0 |
| CA1 | 1.25 | 1.25 | 1.25 | 1.5 | 1.5 | 1.5 |
| CA2 | 2 | 2 | 2 | 4 | 4 | 4 |
| CA3 | 2 | 2 | 2 | 0 | 0 | 0 |
| Total, phr | 198.3 | 193.3 | 193.3 | 166.0 | 161.0 | 161.0 |

| Stock Properties | | | | | | |
|---|---|---|---|---|---|---|
| Compound | C101 | 102 | 103 | C104 | 105 | 106 |
| MOONEY VISCOSITY | | | | | | |
| ML(1 + 4) at 100° C. | 40.0 | 44.9 | 32.7 | 46.0 | 56.0 | 50.0 |
| MOONEY SCORCH, MS at 121° C. | | | | | | |
| Minimum, mu | 22.3 | 29.9 | 16.2 | 23.9 | 25.7 | 21.6 |
| t(3), min | 6.82 | 7.11 | 5.87 | 5.54 | 3.97 | 5.13 |
| t(10), min | 13.49 | 15.64 | 15.56 | 13.31 | 5.78 | 9.06 |
| t(18), min | 20.82 | >20 | >20 | 19.89 | 8.60 | 16.65 |
| MDR at 177° C., 0.5° Arc | | | | | | |
| ML, dNm | 0.88 | 0.84 | 0.59 | 0.63 | 0.78 | 0.75 |
| MH, dNm | 6.98 | 8.00 | 7.79 | 11.84 | 14.06 | 14.06 |
| ts2, min | 1.44 | 1.38 | 1.56 | 1.20 | 0.97 | 1.22 |
| t(50), min | 1.95 | 2.22 | 2.52 | 2.83 | 2.51 | 3.43 |
| t(90), min | 10.46 | 14.41 | 14.65 | 11.95 | 13.27 | 15.13 |

The compounds in Table 1 were vulcanized by press-curing for five minutes at 177° C. and post cured for four hours at 175° C. These were tested for heat aging and fluid aging and the results summarized in Table 2.

TABLE 2

| Vulcanizate Properties | | | | | | |
|---|---|---|---|---|---|---|
| | Vulcanizate | | | | | |
| | C111 | 112 | 113 | C114 | 115 | 116 |
| Compound | C101 | 102 | 103 | C104 | 105 | 106 |
| 1) COMPRESSION SET, METHOD B, PLIED PELLETS | | | | | | |
| After 70 hours at 150° C. | 24.5 | 24.7 | 22.2 | 20.5 | 19.6 | 19.3 |

TABLE 2-continued

Vulcanizate Properties

| | Vulcanizate | | | | | |
|---|---|---|---|---|---|---|
| | C111 | 112 | 113 | C114 | 115 | 116 |
| 2) STRESS-STRAIN AND HARDNESS. ORIGINAL AT 23° C. | | | | | | |
| Hardness, Shore A, points | 60.7 | 61.4 | 61.2 | 66.9 | 65.4 | 68.7 |
| M 100%, MPa | 3.6 | 3.6 | 3.3 | 5.5 | 5.9 | 5.8 |
| Tb, MPa | 10.0 | 11.5 | 10.8 | 12.2 | 16.0 | 14.5 |
| Eb, % | 254 | 304 | 314 | 207 | 243 | 239 |
| Tear, Die C, kN/m | 20.5 | 25.4 | 26.8 | 25.6 | 25.9 | 28.9 |
| Tg by DSC, Infl. Point, ° C. | −52.6 | −51.2 | −52.0 | −41.3 | −41.1 | −41.9 |
| 3A) STRESS-STRAIN AND HARDNESS AFTER AGING 1 WEEK at 150° C. IN AIR | | | | | | |
| Hardness, Shore A, Points | 68.7 | 62.8 | 63.7 | 68.7 | 66.9 | 70.0 |
| M 100%, MPa | 4.2 | 3.7 | 3.5 | 6.1 | 6.3 | 5.8 |
| Tb, MPa | 9.5 | 10.6 | 10.8 | 12.1 | 16.0 | 14.8 |
| Eb, % | 258 | 284 | 312 | 194 | 241 | 247 |
| 3B) STRESS-STRAIN AND HARDNESS AFTER AGING 3 WEEKS at 150° C. IN AIR | | | | | | |
| Hardness, Shore A, Points | 74.6 | 65.1 | 67.3 | 70.4 | 67.8 | 70.0 |
| M 100%, MPa | 5.1 | 4.1 | 3.6 | 6.0 | 6.2 | 5.8 |
| Tb, MPa | 9.2 | 10.2 | 9.3 | 12.0 | 14.9 | 13.9 |
| Eb, % | 230 | 275 | 288 | 204 | 243 | 253 |
| 3C) STRESS-STRAIN AND HARDNESS AFTER AGING 6 WEEKS at 150° C. IN AIR | | | | | | |
| Hardness, Shore A, Points | 78.2 | 67.9 | 68.2 | 71.1 | 67.7 | 69.8 |
| M 100%, MPa | 5.8 | 4.2 | 3.9 | 6.5 | 6.2 | 5.8 |
| Tb, kPa | 8.7 | 9.4 | 10.8 | 11.6 | 14.4 | 13.1 |
| Eb, % | 186 | 251 | 261 | 185 | 228 | 255 |
| 4) STRESS-STRAIN AND HARDNESS AFTER AGING 1 WEEK at 150° C. IN IRM 903 OIL | | | | | | |
| Hardness, Shore A, Points | 34.8 | 35.9 | 33.6 | 44.6 | 47.0 | 47.3 |
| M 100%, MPa | 4.2 | 4.3 | 4.1 | 6.5 | 7.2 | 7.5 |
| Tb, MPa | 5.6 | 6.3 | 5.6 | 6.7 | 7.4 | 7.4 |
| Eb, % | 127 | 132 | 128 | 103 | 103 | 105 |
| Volume Change, % | 89.6 | 91.1 | 99.4 | 85.6 | 84.9 | 88.6 |
| Weight Change, % | 65.0 | 67.0 | 74.0 | 63.9 | 64.7 | 66.7 |

Table 3 illustrates vulcanizates from Table 2, showing improved dynamic resistance to crack growth, as indicated by the comparison of Example 113 to Comparative Example C111.

TABLE 3

DeMattia Crack Growth at 23° C. at frequency of 2.5 Hz

| | Vulcanizate | | | | | |
|---|---|---|---|---|---|---|
| | C111 | 112 | 113 | C114 | 115 | 116 |
| Cycles to 4.5 mm length | 150 | 780 | 1050 | 3 | 13 | 9 |
| Cycles to 8.5 mm length | 2000 | 5000 | 6700 | 95 | 180 | 165 |
| Cycles to 12.5 mm length | 6800 | 9400 | 18000 | 270 | 410 | 380 |

Having thus described and exemplified the invention with a certain degree of particularity, the following claims are not to be so limited but are to be afforded a scope commensurate with the wording of each element of the claim and equivalents thereof.

The invention claimed is:

1. A composition comprising an ethylene copolymer derived from copolymerization of ethylene, about 10 to about 40 weight % of a first alkyl acrylate having from 1 to 4 carbons in the alkyl group, about 15 to about 65 weight % of a second different alkyl acrylate having from 1 to 4 carbons in the alkyl group, and 0 to about 5 weight % of 1,4-butene-dioic acid or its derivative wherein the derivative is an anhydride of the acid or a monoalkyl ester of the acid; the alkyl group in the monoalkyl ester has from 1 to about 6 carbon atoms, or combinations of two or more thereof; and the copolymer has a number average molecular weight ($M_n$) above 40,000, has a melt index (MI) of from about 3 to about 30 g/10 minutes, and has a polydispersity of from about 2.5 to about 6.

2. The composition of claim 1 wherein the 1,4-butene-dioic acid or its derivative comprises from about 1 to 5 weight % of the copolymer and is methyl hydrogen maleate, ethyl hydrogen maleate, propyl hydrogen maleate, butyl hydrogen maleate, or combinations of two or more thereof.

3. The composition of claim 1 further comprising a curing agent, an additive, and optionally an additional polymer wherein the additive includes an antioxidant, an internal release agent, a scorch retarder, a plasticizer, an accelerator, a filler, or combinations of two or more thereof the additional polymer includes an ethylene alkyl acrylate copolymer, a polyacrylate copolymer, or combinations thereof and the composition is optionally a cured or post-cured composition.

4. The composition of claim 1 further comprising a curing agent, a second polymer, and optionally an additive wherein the second polymer includes a thermoset, a thermoplastic, or combinations thereof the thermoset includes an epoxy resin, a phenolic resin, unsaturated polyester resin, vinyl ester resin, or combinations of two or more thereof; the additive includes filler, reinforcing fiber, fibrous structure, or combinations of two or more thereof; and the composition is optionally a cured composition.

5. The composition of claim 1 wherein the first alkyl acrylate comonomer is methyl acrylate present in the copolymer at 10 to 40 weight % and the second alkyl acrylate comonomer is n-butyl acrylate present in the copolymer from a lower limit of 15 weight % when methyl acrylate is present within the range of 23 to 40 weight % and from a lower limit of 47 weight % when methyl acrylate is present at 10 weight % and from a lower limit that varies linearly between the lower limit at 10 weight % methyl acrylate and the lower limit at 23 weight % methyl acrylate to an upper limit of 35 weight % when methyl acrylate is present at 40 weight % and to an upper limit of 65 weight % when methyl acrylate is present at 10 weight % and to an upper limit that varies linearly between 40 and 10 weight % methyl acrylate.

6. The composition of claim 1 wherein the first alkyl acrylate comonomer is methyl acrylate present in the copolymer at 15 to 30 weight % and the second alkyl acrylate comonomer is n-butyl acrylate present in the copolymer from a lower limit of 20 weight % when methyl acrylate is present within the range of 27 to 30 weight % and from a lower limit of 45 weight % when methyl acrylate is present at 15 weight % and from a lower limit that varies linearly between the lower limit at 15 weight % methyl acrylate and the lower limit at 27 weight % methyl acrylate to an upper limit of 45 weight % when methyl acrylate is present at 30 weight % and to an upper limit of 60 weight % when methyl acrylate is present at 15 weight % and to an upper limit that varies linearly between 30 and 15 weight % methyl acrylate.

7. The composition of claim 1 wherein the ethylene copolymer is derived from 20 to 30 weight % of methyl acrylate, 35 to 45 weight % of n-butyl acrylate, and 2 to 5 weight % of a monoalkyl ester of 1,4-butene-dioic acid; the monoalkyl ester includes methyl hydrogen maleate, ethyl hydrogen maleate, propyl hydrogen maleate, butyl hydrogen maleate, or combinations of two or more thereof; and the ethylene copolymer has an $M_n$ from about 45,000 to about 65,000 and a polydispersity from about 2.5 to 5.

8. The composition of claim 1 wherein the first alkyl acrylate is methyl acrylate, ethyl acrylate, or combinations thereof the second alkyl acrylate has 3 or 4 carbon atoms in the alkyl group; and the copolymer has an $M_n$ from about 45,000 to about 65,000 and a polydispersity from about 2.5 to 5.

9. The composition of claim 8 wherein the first alkyl acrylate is methyl acrylate and the second alkyl acrylate is n-butyl acrylate.

10. The composition of claim 8 wherein the 1,4-butene-dioic acid or its derivative comprises from about 1 to 5 weight % of the copolymer and is methyl hydrogen maleate, ethyl hydrogen maleate, propyl hydrogen maleate, butyl hydrogen maleate, or combinations of two or more thereof.

11. The composition of claim 7 further comprising a curing agent, an additive, optionally an additional polymer wherein the additive includes an antioxidant, an internal release agent, a scorch retarder, a plasticizer, an accelerator, a filler, or combinations of two or more thereof; the additional polymer includes an ethylene alkyl acrylate copolymer, a polyacrylate copolymer, or combinations thereof; and the composition is optionally a cured or post-cured composition.

12. The composition of claim 7 further comprising a curing agent, a second polymer, and optionally an additive wherein the second polymer includes a thermoset, a thermoplastic, or combinations thereof; the thermoset includes an epoxy resin, a phenolic resin, or combinations thereof; the additive includes filler, reinforcing fiber, fibrous structure, or combinations of two or more thereof; and the composition is optionally a cured composition.

13. An article comprising a composition which comprises or is produced from
   an ethylene copolymer, a curing agent, an additive, and optionally an additional polymer wherein the ethylene copolymer is as recited in claim 1; the additive includes an antioxidant, an internal release agent, a scorch retarder, a plasticizer, an accelerator, a filler, or combinations of two or more thereof; the additional polymer includes an ethylene alkyl acrylate copolymer, a polyacrylate copolymer, or combinations thereof; and the article includes constant velocity joint boots, I-shaft boots, half shaft boots, spark plug boots, hoses, seals, gaskets, dampers, belts, or ignition wire jacketing; or
   an ethylene copolymer, a curing agent, a second polymer, and optionally an additive wherein the ethylene copolymer as recited in claim 1; the second polymer includes a thermoset, a thermoplastic, or combinations thereof; the thermoset includes an epoxy resin, a phenolic resin, unsaturated polyester resin, vinyl ester resin, or combinations of two or more thereof; the additive includes filler, reinforcing fiber, fibrous structure, or combinations of two or more thereof; and the article includes printed circuit board, brake pad, or clutch facing.

14. The article of claim 13 wherein the ethylene copolymer is derived from 20 to 30 weight % of methyl acrylate, 35 to 45 weight % of n-butyl acrylate, and 2 to 5 weight % of a monoalkyl ester of 1,4-butene-dioic acid including methyl hydrogen maleate, ethyl hydrogen maleate, propyl hydrogen maleate, butyl hydrogen maleate, or combinations of two or more thereof; and the copolymer has an $M_n$ from about 45,000 to about 65,000 and a polydispersity from about 2.5 to 5.

15. A process comprising contacting ethylene with a first alkyl acrylate, a second alkyl acrylate, and optionally 1,4-butene-dioic acid or its derivative under a condition effective to produce an ethylene copolymer wherein
   the ethylene copolymer is as recited in claim 1;
   the first alkyl acrylate has 1 to 4 carbons in the alkyl group;
   the second alkyl acrylate differs from the first alkyl acrylate and has 1 to 4 carbons in the alkyl group;
   the derivative is an anhydride of the acid, a monoalkyl ester of the acid, or combinations thereof; the alkyl group in the monoalkyl ester has 1 to about 6 carbon atoms, or combinations of two or more thereof; and
   the condition includes a temperature from 120° C. to 185° C., a pressure from 1900 to 2810 kg/cm$^2$, and a feed temperature from 30° C. to 90° C.

16. The process of claim 15 wherein the ethylene copolymer is derived from 20 to 30 weight % of methyl acrylate, 35 to 45 weight % of n-butyl acrylate, and 2 to 5 weight % of a monoalkyl ester of 1,4-butene-dioic acid including methyl hydrogen maleate, ethyl hydrogen maleate, propyl hydrogen maleate, butyl hydrogen maleate, or combinations of two or more thereof; and the copolymer has an $M_n$ from about 45,000 to about 65,000 and a polydispersity from about 2.5 to 5; the temperature is from 140° C. to 165° C.; the pressure is from 2065 to 2810 kg/cm$^2$; and the feed temperature is from 50° C. to 90° C.

17. The process of claim 15 further comprising combining the ethylene copolymer with a curing agent, an additive, or an additional polymer, or combinations of two or more thereof to produce a compounded composition; optionally forming the compounded composition into a desired shape and concurrently or sequentially curing and optionally post curing the compounded composition wherein
   the additive includes an antioxidant, an internal release agent, a scorch retarder, a plasticizer, an accelerator, a filler, or combinations of two or more thereof;
   the additional polymer includes ethylene alkyl acrylate copolymer, a polyacrylate copolymer, or combinations thereof; and
   the article includes constant velocity joint boots, I-shaft boots, half-shaft boots, spark plug boots, hoses, seals, gaskets, dampers, belts, or ignition wire jacketing.

18. The process of claim 17 wherein the ethylene copolymer is derived from 20 to 30 weight % of methyl acrylate, 35 to 45 weight % of n-butyl acrylate, and 2 to 5 weight % of a monoalkyl ester of 1,4-butene-dioic acid including methyl hydrogen maleate, ethyl hydrogen maleate, propyl hydrogen maleate, butyl hydrogen maleate, or combinations of two or more thereof; and the copolymer has an $M_n$ from about 45,000 to about 65,000 and a polydispersity from about 2.5 to 5; the temperature is from 140° C. to 165° C.; the pressure is from 2065 to 2810 kg/cm$^2$; and the feed temperature is from 50° C. to 90° C.

19. The process of claim 15 further comprising combining the ethylene copolymer with a curing agent, a second polymer, or an additives, or combinations of two or more thereof to produce a compounded composition; fabricating the compounded composition into an article; and optionally subsequently curing the article wherein
   the additive includes filler, reinforcing fiber, fibrous structure, or combinations of two or more thereof;
   the second polymer includes a thermoset, a thermoplastic, or combinations thereof; the thermoset includes an epoxy resin, a phenolic resin, unsaturated polyester resin, vinyl ester resin, or combinations of two or more thereof;

the article includes printed circuit board, brake pad, or clutch facing; and the fabricating includes coating, laminating, molding, extruding, filament winding, calendering, or combinations of two or more thereof.

20. The process of claim 19 wherein the ethylene copolymer is derived from 20 to 30 weight % of methyl acrylate, 35 to 45 weight % of n-butyl acrylate, and 2 to 5 weight % of a monoalkyl ester of 1,4-butene-dioic acid including methyl hydrogen maleate, ethyl hydrogen maleate, propyl hydrogen maleate, butyl hydrogen maleate, or combinations of two or more thereof; and the copolymer has an $M_n$ from about 45,000 to about 65,000 and a polydispersity from about 2.5 to 5; the temperature is from 140° C. to 165° C.; the pressure is from 2065 to 2810 kg/cm$^2$; and the feed temperature is from 50° C. to 90° C.

* * * * *